(12) United States Patent
Yamada

(10) Patent No.: US 10,399,535 B2
(45) Date of Patent: Sep. 3, 2019

(54) AIRBAG DEVICE FOR FRONT PASSENGER SEAT

(71) Applicant: TOYODA GOSEI CO., LTD., Kiyosu-shi, Aichi-ken (JP)

(72) Inventor: Ikuo Yamada, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 35 days.

(21) Appl. No.: 15/683,952

(22) Filed: Aug. 23, 2017

(65) Prior Publication Data
US 2018/0056925 A1 Mar. 1, 2018

(30) Foreign Application Priority Data
Aug. 29, 2016 (JP) ................................. 2016-167348

(51) Int. Cl.
| B60R 21/263 | (2011.01) |
| B60R 21/217 | (2011.01) |
| B60R 21/233 | (2006.01) |
| B60R 21/205 | (2011.01) |

(52) U.S. Cl.
CPC .......... B60R 21/263 (2013.01); B60R 21/205 (2013.01); B60R 21/217 (2013.01); B60R 21/233 (2013.01); *B60R 2021/23308* (2013.01); *B60R 2021/2633* (2013.01)

(58) Field of Classification Search
CPC ............ B60R 21/233; B60R 21/23308; B60R 21/263; B60R 2021/2633; B60R 21/205; B60R 21/217
See application file for complete search history.

(56) References Cited

U.S. PATENT DOCUMENTS

| 4,136,894 | A | * | 1/1979 | Ono | ........................ B60R 21/26 102/443 |
| 5,261,693 | A | * | 11/1993 | Krickl | .................... B60R 21/217 280/728.3 |
| 5,400,487 | A | * | 3/1995 | Gioutsos | ........... B60R 21/01534 180/282 |
| 5,860,672 | A | * | 1/1999 | Petersen | ............... B60R 21/217 280/728.2 |

(Continued)

FOREIGN PATENT DOCUMENTS

| JP | 2005-132293 A | 5/2005 |
| JP | 4289066 B2 | 4/2009 |
| JP | 2015-231808 A | 12/2015 |

*Primary Examiner* — Frank B Vanaman
(74) *Attorney, Agent, or Firm* — Posz Law Group, PLC

(57) ABSTRACT

An airbag device for a front passenger seat includes an airbag, two inflators each for feeding the airbag with an inflation gas, a case which holds the airbag and inflators, and a retainer which mounts the airbag and inflators on the case. One of the two inflators is a potentially-influential inflator whose inflation gas may influence the other inflator. The retainer includes a holding plate section which is disposed on an inner surface of the airbag, two insert openings for receiving main bodies of the two inflators, and a shielding wall which rises out of a position of the holding plate section between the two insert openings and extends to a vicinity of a height of the top end plane of the main body of the potentially-influential inflator. The shielding wall shields the other inflator from an inflation gas emitted by the potentially-influential inflator.

11 Claims, 8 Drawing Sheets

(56) References Cited

U.S. PATENT DOCUMENTS

| | | | | |
|---|---|---|---|---|
| 5,992,875 | A | * | 11/1999 | Cundill ................. B60R 21/217 280/728.2 |
| 6,398,257 | B1 | * | 6/2002 | Ehama .................. B60R 21/013 280/735 |
| 2002/0113421 | A1 | * | 8/2002 | Haeuslmeier ......... B60R 21/013 280/741 |
| 2004/0050281 | A1 | * | 3/2004 | Hofmann ............ B60R 21/2644 102/200 |
| 2005/0110247 | A1 | * | 5/2005 | Suzuki ................. B60R 21/205 280/728.3 |
| 2006/0214406 | A1 | * | 9/2006 | Parkinson ............. B60R 21/217 280/743.2 |
| 2008/0238060 | A1 | * | 10/2008 | Yokoyama ............ B60R 21/205 280/741 |
| 2016/0159311 | A1 | * | 6/2016 | Yamada ................ B60R 21/233 280/729 |

* cited by examiner

AIRBAG DEVICE FOR FRONT PASSENGER SEAT

CROSS REFERENCE TO RELATED APPLICATIONS

The present application claims priority from Japanese Patent Application No. 2016-167348 of Yamada, filed on Aug. 29, 2016, the entire disclosure of which is incorporated herein by reference.

BACKGROUND OF THE INVENTION

1. Field of the Invention

The present invention relates to an airbag device for a front passenger seat which employs two inflators for feeding an airbag with an inflation gas.

2. Description of Related Art

As disclosed in JP4289066 B and JP2005-132293 A, by way of example, some airbag devices for a front passenger seat employ two inflators for inflating an airbag. Such an airbag device includes an airbag, two inflators, a case and a retainer. The airbag is configured inflatable with an inflation gas fed from the inflators, and includes two inlet ports, corresponding to the two inflators, for admitting the inflation gas from the inflators. Each of the inflators includes a main body shaped like a pot and a flange which is provided on an outer circumference of the main body. The main body is provided with a plurality of gas outlet ports on the outer circumferential area above the flange, and the gas outlet ports are arranged along the circumferential direction of the area. The case includes a bottom wall to which the airbag and inflators are secured, and stores the airbag in a folded-up configuration. The bottom wall is provided with two insert openings for receiving the main bodies of the two inflators. The retainer is made of sheet metal and includes a holding plate section which is disposed at peripheries of the inlet ports of the airbag inside the airbag and a plurality of bolts formed at a hem of the holding plate section to protrude out of the airbag. The holding plate section is provided with two insert openings for receiving the main bodies of the two inflators. The airbag and inflators are secured to the bottom wall of the case by nut fastening the bolts of the retainer which have gone through the bottom wall of the case and flanges of the inflators.

In the above conventional airbag devices for a front passenger seat, one of the two inflators is sometimes configured to potentially influence the other inflator with an inflation gas that it emits. One of the two inflators configured to be actuated prior to the other is an example of such a "potentially-influential inflator". An inflation gas emitted by the potentially-influential inflator actuated first can rupture a sealing tape which has sealed the gas outlet ports of the other inflator and the other inflator may fail to secure a predetermined pressure. There is also a fear that an inflation gas fed from the influential inflator may affect an inflation gas of the other inflator and alter the flow of the latter. This can lead to change of a contour of the airbag as fully inflated.

JP4289066 B, which was mentioned above, discloses a technology to form a step on the bottom wall of the case to which the two inflators are secured in order to differentiate the heights of gas outlet ports of the two inflators. Even with this technology, however, it is inevitable that the gases emitted from the two inflators interfere each other.

SUMMARY OF THE INVENTION

The present invention contemplates the above-mentioned problem, and has an object to provide an airbag device for a front passenger seat that is capable of actuating two inflators smoothly by preventing one of the inflators from influencing the other inflator.

The airbag device for a front passenger seat of the invention includes an airbag, two inflators for feeding the airbag with an inflation gas, a case which holds the airbag and inflators, and a retainer which mounts the airbag and inflators on the case. The airbag is inflatable with an inflation gas for protecting a front seat passenger, and includes two inlet ports each of which receives a main body of one of the inflators for taking in an inflation gas. Each of the inflators includes a columnar main body and a flange which protrudes out of an outer circumferential plane of the main body. A region of the main body disposed towards the top end plane is provided with a plurality of gas outlet ports on the outer circumferential plane and inserted into the airbag via one of the inlet ports. The gas outlet ports of each of the inflators are formed in such a manner as to form a row along a circumferential direction of the main body. One of the two inflators is a potentially-influential inflator whose inflation gas may influence the other inflator. The case includes a bottom wall, and the bottom wall includes two insert openings for receiving the main bodies of the inflators. The retainer is disposed at peripheries of the inlet ports inside the airbag and mounts the airbag and the inflators on the bottom wall of the case. The retainer includes a holding plate section and a plurality of bolts. The holding plate section is disposed at the peripheries of the inlet ports of the airbag and includes two insert openings for receiving the main bodies of the inflators. The bolts are formed at a periphery of each of the insert openings of the holding plate section so as to penetrate the airbag, the bottom wall of the case and the flanges of the inflators and be fastened with nuts. The retainer further includes a shielding wall which rises out of a position of the holding plate section between the two insert openings and extends to a vicinity of a height of the top end plane of the main body of the potentially-influential inflator above a height of the gas outlet ports of the potentially-influential inflator for shielding the other inflator from an inflation gas emitted by the potentially-influential inflator.

With the airbag device for a front passenger seat of the invention, when the potentially-influential inflator which may influence the other inflator (namely, potentially-influenced inflator) is actuated and emits an inflation gas in a direction perpendicular to an axial direction of the main body, the gas emitted out of the potentially-influential inflator towards the potentially-influenced inflator will hit the shielding wall and be redirected upward (towards a direction away from the holding plate section). Further, since the shielding wall extends above the height of the gas outlet ports of the potentially-influential inflator, it will shield the potentially-influenced inflator from the inflation gas emitted out of the potentially-influential inflator in a steady fashion, and prevent a breakage of the sealing tape of the potentially-influenced inflator which may cause a chain-reaction ignition or the like of the potentially-influenced inflator. Moreover, the shielding wall has such a height as to extend to a vicinity of the top end plane of the main body of the potentially-influential inflator. That is, the shielding wall is not too tall. This configuration will not reduce a storing space for the airbag inside the case. In addition, the shielding wall has only to be formed to rise from the holding plate section.

Therefore, the airbag device for a front passenger seat of the invention is capable of preventing the potentially-influential inflator from influencing the other inflator and actuating both of the two inflators smoothly with a simple remedy of providing the shielding wall.

In the present invention, one inflator configured to be actuated prior to the other inflator, one inflator whose gas inlet ports are located at a higher position than those of the other inflator or the like are assumed as examples of the potentially-influential inflator. That is, if the shielding wall is provided between the potentially-influential inflator which is programmed to be actuated first and the other inflator, the shielding wall will redirect an inflation gas emitted from the potentially-influential inflator and prevent the gas from breaking a sealing tape of the other inflator programmed to be actuated later. In an instance where gas outlet ports of the potentially-influential inflator are located at a higher position than those of the other (potentially-influenced) inflator, even when the two inflators are actuated at the same time, an inflation gas emitted by the gas outlet ports of the potentially-influential inflator (i.e. from the higher position) may influence the other, potentially-influenced inflator without a shielding wall. However, the shielding wall will shield the potentially-influenced inflator from the inflation gas of the potentially-influential inflator, such that an inflation gas emitted from the gas outlet ports of the potentially-influenced inflator will be fed into the airbag unaffectedly and inflate the airbag into a predetermined contour.

In the airbag device for a front passenger seat of the invention, it is desired that the holding plate section of the retainer is made of a metal plate, and that the shielding wall is composed of a cut and raised portion of the metal plate.

With this configuration, the shielding wall can be formed easily by cutting out a portion of the metal plate (i.e. the holding plate section) in a predetermined shape and bending upward a portion on the inner side of the cut-out portion, at the same time as forming the insert openings by pressing.

Moreover, in the airbag device of the invention, it is desired that the retainer further includes a reinforcing rib which rises from an entire outer circumferential edge of the holding plate section, and that a portion of the reinforcing rib disposed in a surrounding area of the potentially-influential inflator extends up to a vicinity of the height of the top end plane of the main body of the potentially-influential inflator, and a portion of the reinforcing rib disposed in a surrounding area of the potentially-influenced inflator extends up to a vicinity of a height of the top end plane of the main body of the potentially-influenced inflator.

This configuration will facilitate a setting of the main bodies of the two inflators into the airbag via the insert openings of the case, the insert openings of the retainer and inlet openings of the airbag. To describe specifically, before the main bodies of the inflators are put into the airbag, the airbag in a folded-up configuration is placed on the bottom wall of the case. Inside the airbag is the retainer and the bolts of the retainer protrude downward out of the bottom wall of the case. Since the reinforcing rib of the retainer stands as tall as the top end plane of the main body of the potentially-influential inflator in the vicinity of the potentially-influential inflator and stands as tall as the top end plane of the main body of the potentially-influenced inflator in the vicinity of the potentially-influenced inflator, the reinforcing rib and the shielding wall will support the airbag with the upper ends such that a folded-up region of the airbag may not sag towards the insert openings of the holding plate section and storing spaces for the main bodies of the inflators are secured above the insert openings of the retainer. As a consequence, the main bodies of the inflators can be easily inserted into the airbag via the insert openings of the case without so much need to push up the folded-up region of the airbag. Thereafter, by nut-fastening of the bolts of the retainer protruding out of the mounting holes of the flanges of the inflators, the inflators are secured to the bottom wall of the case as well as the airbag smoothly.

In the above instance, it is desired that the case includes a side wall that extends upward from an outer circumferential edge of the bottom wall to a position higher than the reinforcing rib, and that the reinforcing rib is disposed at an inner side of the side wall of the case such that a clearance is formed between the reinforcing rib and the side wall. With this configuration, the case smoothly accommodates the airbag in a folded-up configuration in a space surrounded by the side wall of the case above the reinforcing rib. Of course, the reinforcing rib of the retainer helps secure the storing spaces for the main bodies of the inflators above the insert openings of the holding plate section, such that the main bodies of the inflators can be smoothly inserted into the case from below the bottom wall of the case.

In the present invention, at least one of the two inflators may have two rows of the gas outlet ports disposed one above the other on the outer circumferential plane of the main body so as to emit the inflation gas out of one row before the other. This configuration will enable a variety of actuation patterns of the two inflators according to physical size or the like of a passenger to be protected.

Furthermore, if the main body of one of the inflators has a greater outer diameter than that of the other inflator, it is desired that the shielding wall has such a width that is smaller than the greater outer diameter and greater than an outer diameter of the main body of the other inflator. This configuration will contribute to size reduction of the shielding wall.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
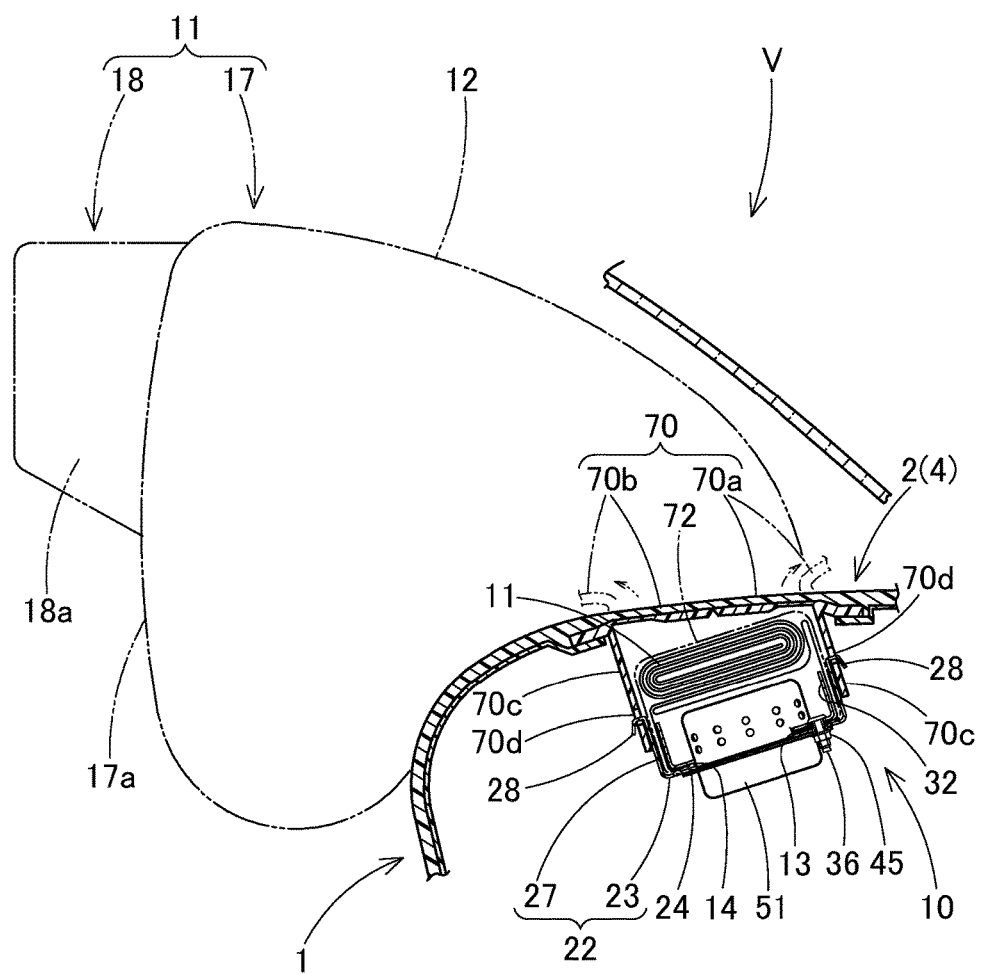
FIG. 1 is a schematic vertical section of an airbag device for a front passenger seat embodying the invention as mounted on a vehicle.
Figure 2:
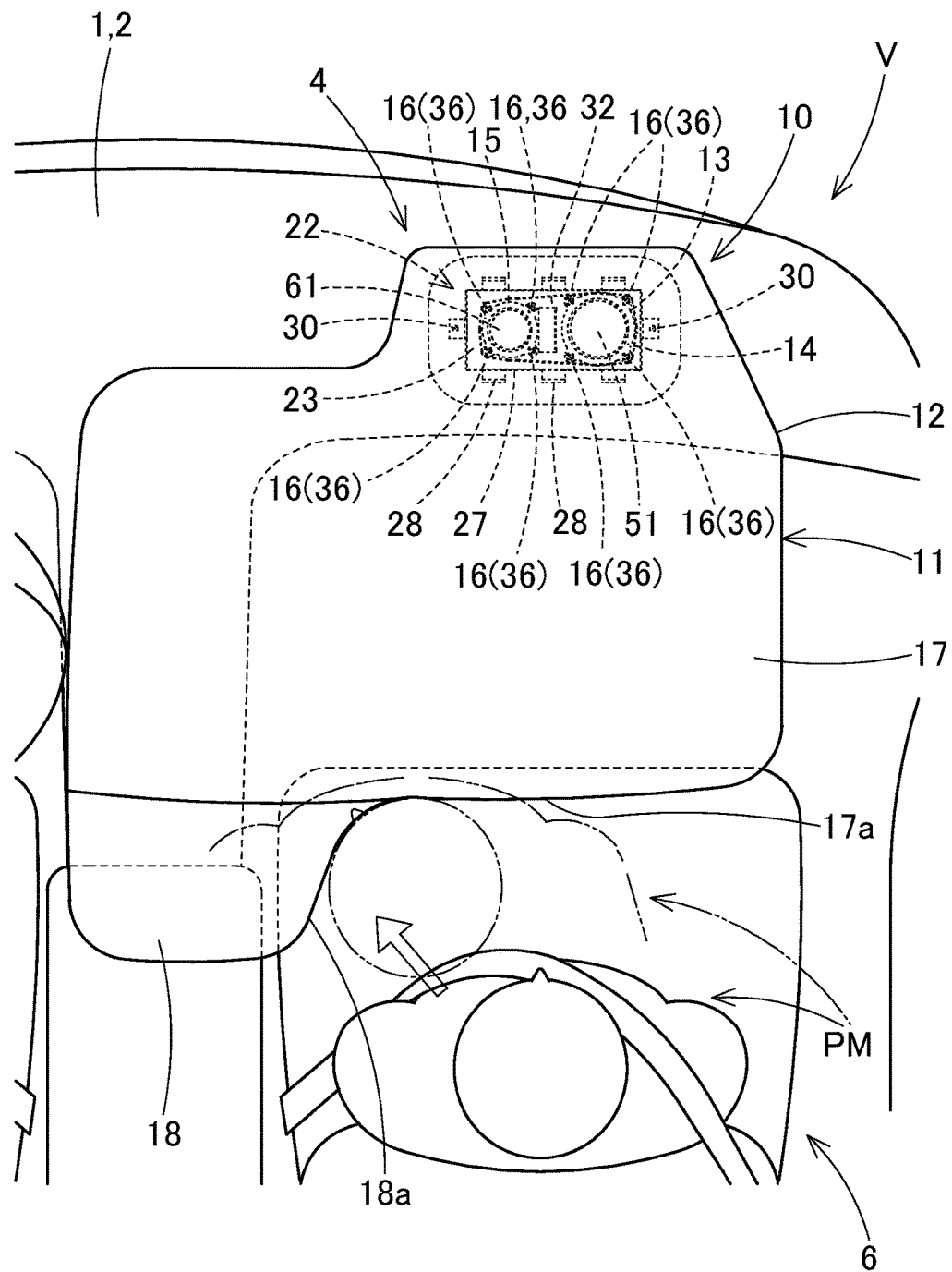
FIG. 2 is a schematic plan view of the airbag device of FIG. 1 as its airbag is fully deployed.

FIGS. 1 and 2 depict an airbag device 10 for a front passenger seat embodying the invention. The airbag device 10 is mountable on a region (a passenger-side region) 4 of an instrument panel or dashboard 1 disposed in front of a front passenger seat 6 of a vehicle V. As shown in FIGS. 1 and 2, the airbag device 10 includes an airbag 11, a case 22, a retainer 32, two inflators 51 and 61 for supplying the airbag 11 with an inflation gas G, and an airbag cover 70 composed of a portion of the dashboard 1.

Unless otherwise specified, front/rear, up/down and left/right directions in this specification are intended to refer to front/rear, up/down and left/right directions of the vehicle V.

The airbag 11 is designed to be inflated with an inflation gas and deploy towards the front passenger seat 6 for protecting the front seat passenger PM. The airbag 11 is provided with two inlet ports 14 and 15 for receiving the two inflators 51 and 61 and admitting inflation gases from the inflators 14 and 15. The airbag 11 as inflated includes a main inflatable section 17 and an auxiliary inflatable section 18 which is disposed on a side of the main inflatable section 17 facing towards an interior of the vehicle V and deployable in such a manner as to protrude farther rearward than the main inflatable section 17. An outer shell 12 of the airbag 11 includes a front-collision arresting surface 17a on a rear plane of the main inflatable section 17 for catching the passenger PM in the event of a frontal collision of the vehicle V and an oblique-collision arresting surface 18a on a side of the auxiliary inflatable section 18 for catching the passenger PM in the event of an offset collision of the vehicle V as he moves diagonally forward and towards the center in a width direction of the vehicle V.

The airbag 11 includes, on the underside of the front portion, a mounting region 13 to be secured to a later-described bottom wall 23 of the case 22. The mounting region 13 is a generally rectangular area provided with two round inlet ports 14 and 15 for receiving later-described main bodies 52 and 62 of the inflators 51 and 61. The inlet ports 14 and 15 are disposed side by side in a left- and right direction in the mounting region 13.

Each of the inlet ports 14 and 15 is formed to the outer diameter D1/D2 (FIG. 5) of the main body 52/62 of the corresponding inflator 51/61. The inlet port 14 is slightly larger than the inlet port 15. There are formed four mounting holes 16 around each of the inlet ports 14 and 15 for receiving later-described bolts 36 of the retainer 32.

Figure 3:
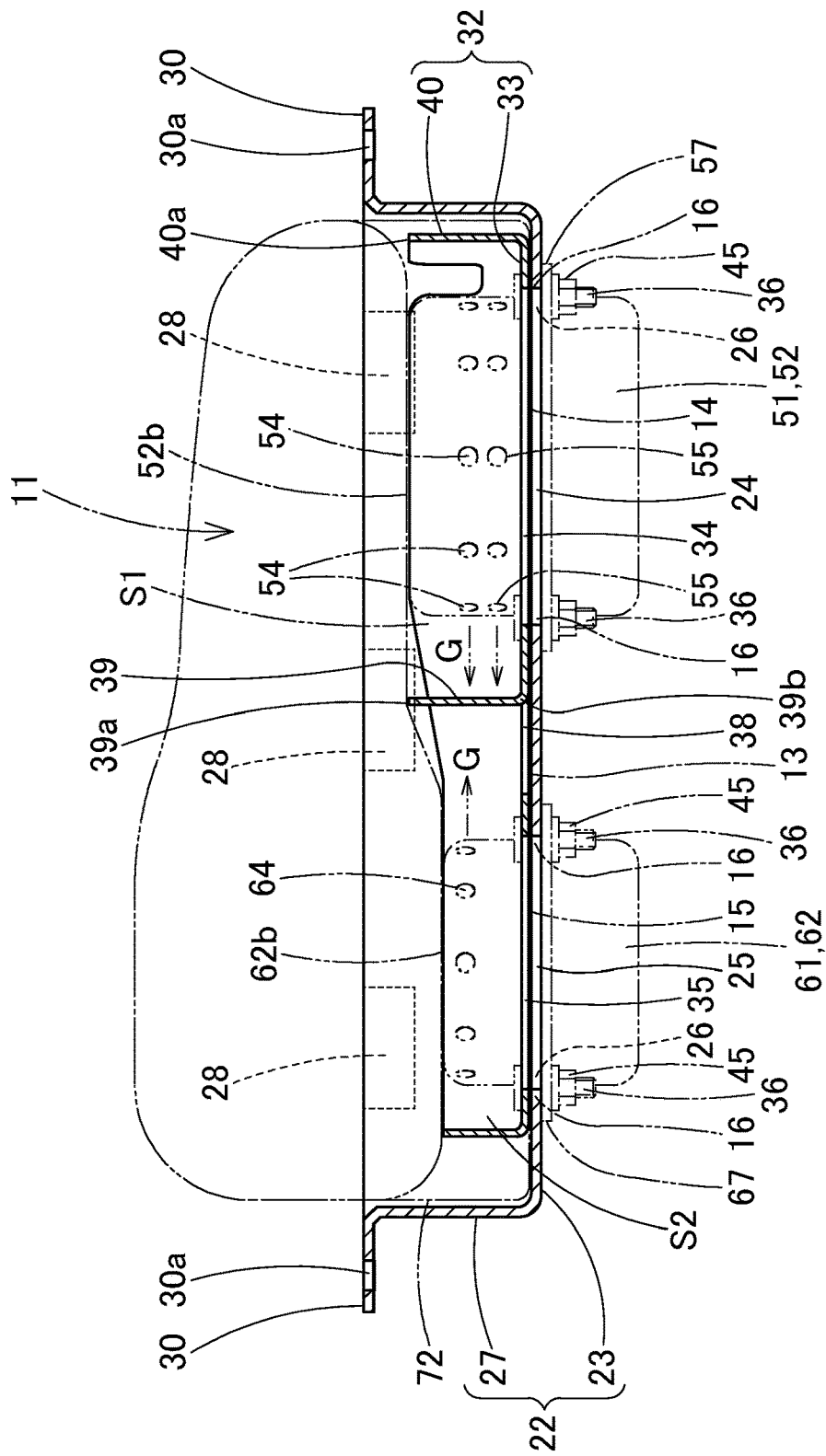
FIG. 3 is a schematic vertical section of the airbag device of FIG. 1 taken along a left and right direction of the vehicle.
Figure 4:
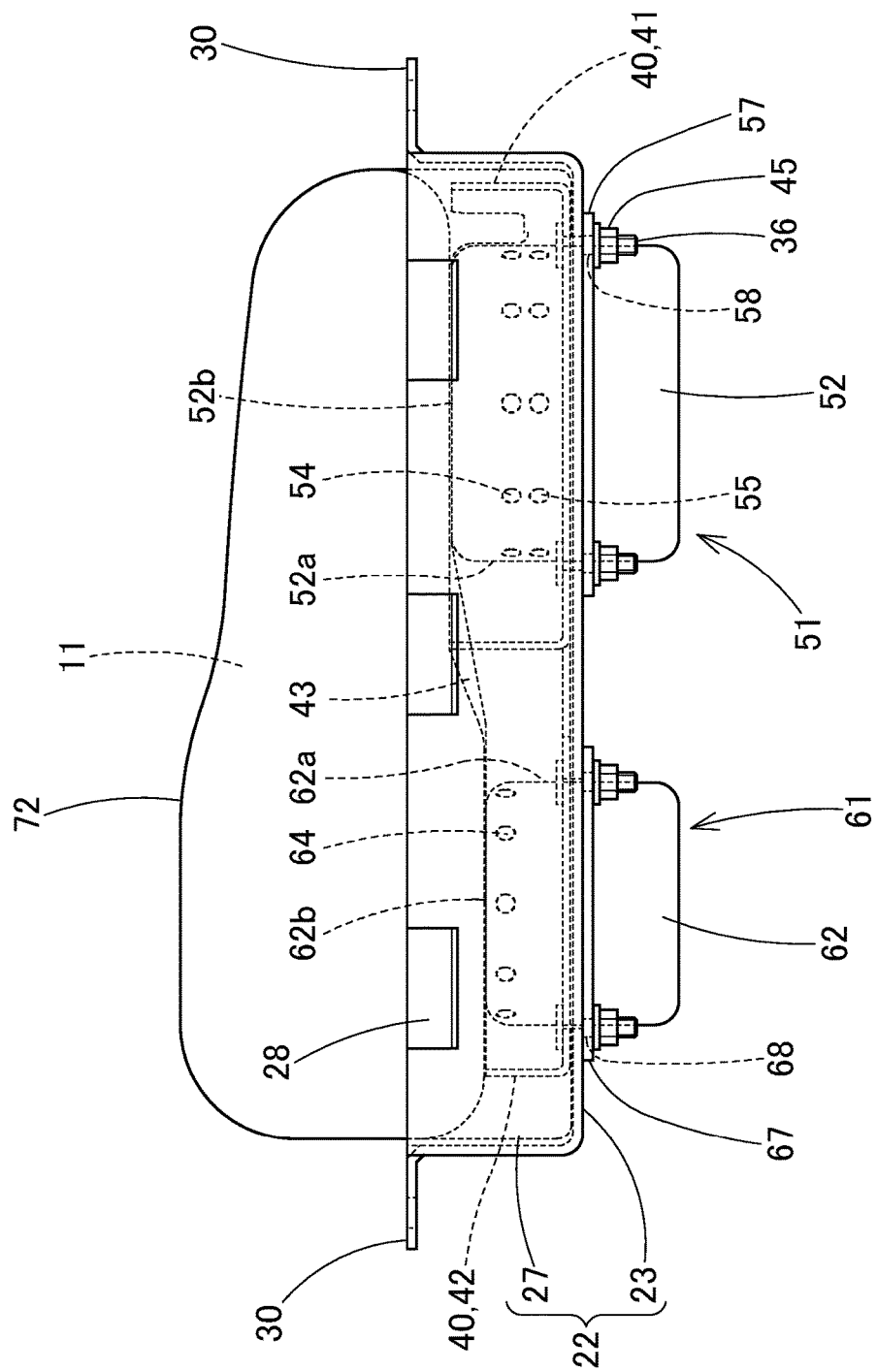
FIG. 4 is a front elevation of the airbag device of FIG. 1 showing the way two inflators are mounted on a case which has housed an airbag.
Figure 5:
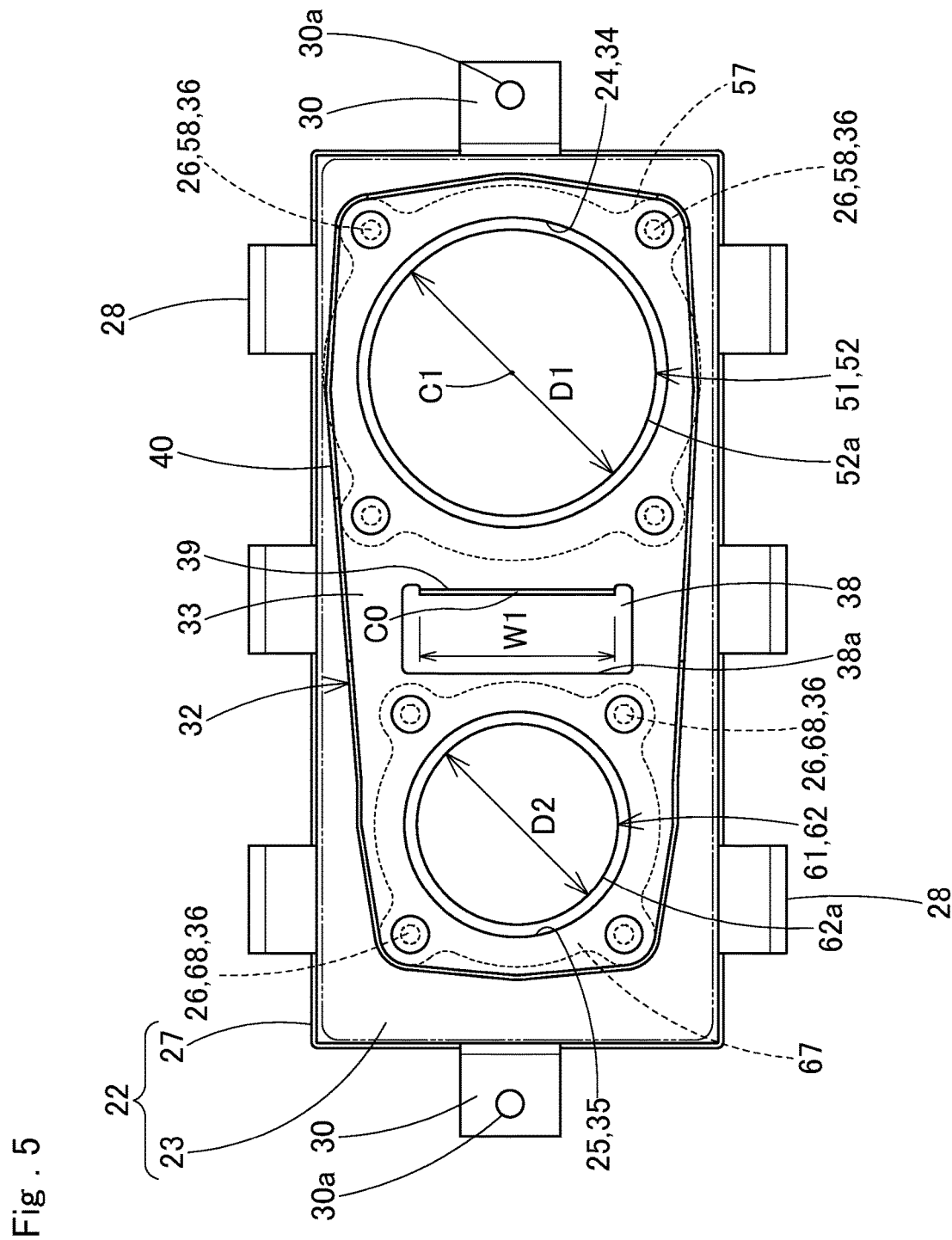
FIG. 5 is a plan view of the case on which a retainer and the inflators are mounted.
Figure 6:
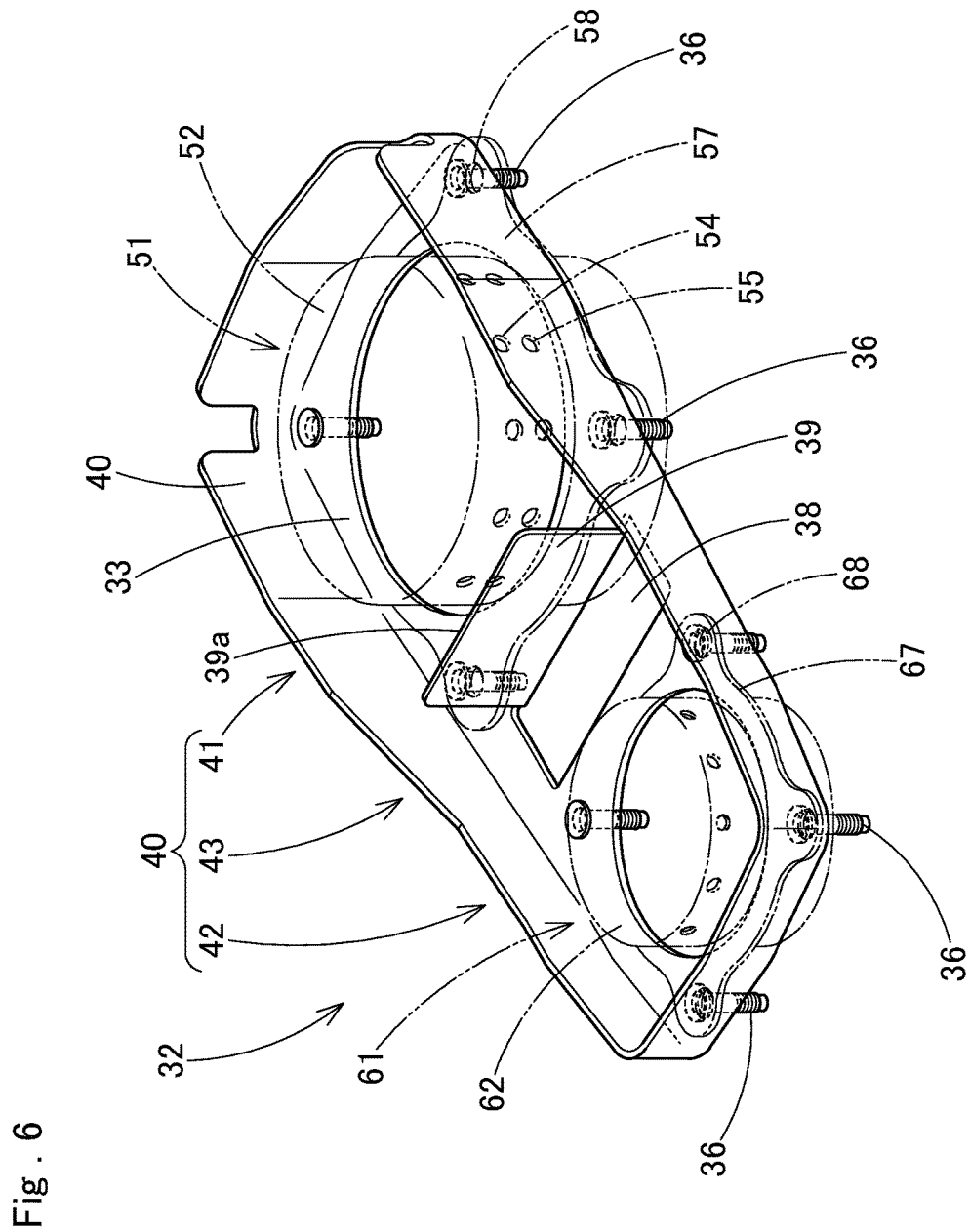
FIG. 6 is a perspective view of the retainer.

As shown in FIGS. 3 to 5, the case 22 is made of sheet metal and includes a bottom wall 23 having a generally rectangular plate shape and a side wall 27 which has a generally square tubular shape and extends upward from the outer circumferential edge of the bottom wall 23. The bottom wall 23 is provided with two round insert openings 24 and 25 for receiving the main bodies 52 and 62 of the inflators 51 and 61 from below. Corresponding to the outer diameters D1 and D2 of the main bodies 52 and 62 of the inflators 51 and 61, the insert opening 24 is formed slightly greater than the opening 25. Four mounting holes 26 are formed around each of the insert openings 24 and 25 for receiving the bolts 36 of the retainer 32.

The side wall 27 is provided, on each of the upper edges of the regions opposed in a front and rear direction, three retaining hooks 28 each formed into a reversed J shape. The retaining hooks 28 are inserted into later-described retaining holes 70d of the side wall 70c of the airbag cover 70 and retained by the side wall 70c, as shown in FIG. 1.

The case 22 further includes, on the left and right regions, mounting members 30 used to mount the airbag device 10 on the vehicle V. Each of the mounting members 30 includes a mounting hole 30a for receiving a bolt for fastening the mounting member 30 to a bracket extending from a dashboard reinforcement.

As shown in FIG. 1, the airbag cover 70 is disposed on the top plane 2 of the dashboard 1 and forms a part of the dashboard 1 while it covers the airbag 11 stored in the case 22. The airbag cover 70 includes two doors 70a and 70b adapted to open forward and rearward when pushed by the airbag 11 upon airbag deployment. The airbag cover 70 further includes, around the doors 70a and 70b, a side wall 70c which extends downward in a square tubular shape. As described above, the side wall 70c is provided, on the regions opposed in a front and rear direction, with a plurality of retaining holes 70d for receiving the retaining hooks 28 of the case 22.

As shown in FIGS. 3 to 6, each of the inflators 51 and 61 includes a columnar or pot-shaped main body 52/62 which feeds the airbag 11 with an inflation gas and a flange 57/67 having a square plate (or square annular) shape and disposed on the outer circumference of the main body 52/62. The inflator 51 has a greater power than the inflator 61, thus the outer diameter D1 of the main body 52 of the inflator 51 is slightly greater than the outer diameter D2 of the main body 62 of the inflator 61. The inflator 51 is provided, in an area of the outer circumference 52a of the main body 52 disposed towards the top end plane 52b with respect to the flange 57, a plurality of radially arranged gas outlet ports 54 and 55. The gas outlet ports of the inflator 51 are formed in two rows disposed one above the other. The gas outlet ports 54 of the upper row are designed to discharge an inflation gas prior to the outlet ports 55 of the lower row. Each of the rows has about twelve to sixteen gas outlet ports 54/55. The inflator 62 is provided, in an area of the outer circumference 62a of the main body 62 disposed towards the top end plane 62b with respect to the flange 67, a plurality of (about twelve to sixteen) radially arranged gas outlet ports 64. The gas outlet ports 54, 55 and 64 discharge inflation gases in a direction perpendicular to an axial direction of the main body 52/62.

In the illustrated embodiment, the outer diameter D1 of the main body 52 of the inflator 51 is about 80 mm and the outer diameter D2 of the main body 62 of the inflator 61 is about 60 mm.

The inflators 51 and 61 are designed such that, in terms of height of the outlet ports 54, 55 and 64 from a later-described holding plate section 33 of the retainer 32 as secured to the case 22, the outlet ports 64 are located at the highest position, followed by the outlet ports 54, and the outlet ports 55. Moreover, the top end plane 62b of the inflator 61 is disposed at a lower height than the top end plane 52b of the inflator 51.

The airbag device 10 is so programmed, when a passenger sensor mounted on the front passenger seat detects that the passenger PM is of large build (a man, by way of example), to discharge an inflation gas G out of the gas outlet ports 54 of the inflator 51, then (about 10 ms later) discharge an inflation gas G out of the gas outlet ports 64 of the inflator 61, and then (about 50 ms after the initial actuation of the inflator 51) discharge an inflation gas G out of the gas outlet ports 55 of the inflator 51.

If the passenger PM is of small build (a woman, by way of example), the inflation gas G is discharged out of the gas outlet ports 54 of the inflator 51, then (about 10 ms later) discharged out of the gas outlet ports 64 of the inflator 61 and gas outlet ports 55 of the inflator 51, at the same time.

In either case, the inflator 51 is programmed to be actuated prior to the inflator 61, and serves as a potentially-influential inflator 51 whose inflation gas can influence the other inflator (potentially-influenced inflator) 61.

Each of the flanges 57 and 67 of the inflators 51 and 61 is provided, at four corners, mounting holes 58/68 for receiving the bolts 36 of the retainer 32.

Before the airbag device 10 is mounted on the vehicle V, a not-shown thin sealing tape of aluminum is applied to an area encompassing the outlet ports 54, 55 and 64 on the outer circumferences 52a and 62a of the main bodies 52 and 62 of the inflators 51 and 61 for preventing alteration of gas generating agent stored inside the inflators 51 and 61 due to ambient moisture or the like.

As shown in FIGS. 3 to 7, the retainer 32 is made of a sheet metal formed by pressing a metal plate such as a steel plate. The retainer 32 includes a holding plate section 33 which is disposed at peripheries of the inlet ports 14 and 15 of the airbag 11 inside the airbag 11 and a plurality of bolts 36 formed at a circumferential edge of the holding plate section 33 to protrude out of the airbag 11. The bolts 36 are disposed to go through the mounting holes 16 of the airbag 11, mounting holes 26 of the bottom wall 23 of the case 22 and mounting holes 58 and 68 of the flanges 57 and 67 of the inflators 51 and 61, and then fastened with nuts 45. Thus the mounting region 13 of the airbag 11 and inflators 51 and 61 are mounted on the bottom wall 23 of the case 22. More specifically, when the nuts 45 are fastened, the holding plate section 33 holds down the mounting region 13 of the airbag 11, i.e., the peripheral area of the inlet ports 14 and 15, on the bottom wall 23 of the case 22, and secures the airbag 11 to the bottom wall 23 of the case 22. Also the nuts 45 press the flanges 57 and 67 of the inflators 51 and 61 against the peripheral areas of the insert openings 24 and 25 on the underside of the bottom wall 23 of the case 22. Thus the inflators 51 and 61 are secured to the bottom wall 23 of the case 22.

The holding plate section 33 is provided with two round insert openings 34 and 35 for receiving the main bodies 52 and 62 of the inflators 51 and 61. The insert openings 34 and 35 are disposed side by side in a left and right direction in the holding plate section 33. The insert opening 34 has a greater diameter than the opening 35. The bolts 36 extend downward out of the peripheral areas of the insert openings 34 and 35. Specifically, a total of eight bolts 36 protrude downward out of the peripheral areas of the insert openings 34 and 35 of the holding plate section 33 so as to go through the mounting holes 58 and 68 of the flanges 57 and 67 of the inflators 51 and 61.

In the illustrated embodiment, the region of the holding plate section 33 where the larger opening 34 is disposed has a greater width in a front and rear direction and serves as a broad square region 33a having a generally square outer contour. The region where the insert opening 35 is disposed serves as a narrow square region 33b. Between the broad square region 33a and narrow square region 33b is an intermediate region 33c having a width in a front and rear direction greater than the narrow square region 33b and smaller than the broad square region 33a.

The holding plate section 33 further includes, between the insert openings 34 and 35, a shielding wall 39 for preventing an inflation gas G emitted from the gas outlet ports 54 of the inflator 51 from hitting the inflator 61 directly. The shielding wall 39 is formed into a rectangular plate shape extending along a front and rear direction by cutting out a U-shaped portion 38 of the holding plate section 33, and raising or bending a portion of the holding plate section 33 disposed on the inner side of the cut-out portion 38 upward about the lower end 39b (FIG. 3). The width W1 in a front and rear direction of the shielding wall 39 is smaller than the outer diameter D1 of the main body 52 of the inflator 51 and is greater than a radius (D1/2) of the inflator 51. The width W1 of the illustrated embodiment is about 64 percent of the outer diameter D1 of the main body 52 of the inflator 51. As shown in FIG. 5, the center C0 in a front and rear direction of the shielding wall 39 coincides in position in a front and rear direction with the center C1 of the inflator 51, on the left side of the center C1 of the inflator 51.

In the illustrated embodiment, the width W1 in a front and rear direction of the shielding wall 39 is about 65 mm, which is greater than the outer diameter D2 (about 60 mm) of the inflator 61.

The upper end 39a of the shielding wall 39 is located at a higher position than the upper-row gas outlet ports 54 of the inflator 51 as mounted on the case 22, and located in a vicinity of the height of the top end plane 52b of the main body 52 of the inflator 51. In the illustrated embodiment, the upper end 39a of the shielding wall 39 and the top end plane 52b of the main body 52 of the inflator 51 are located at the same height.

Figure 7:
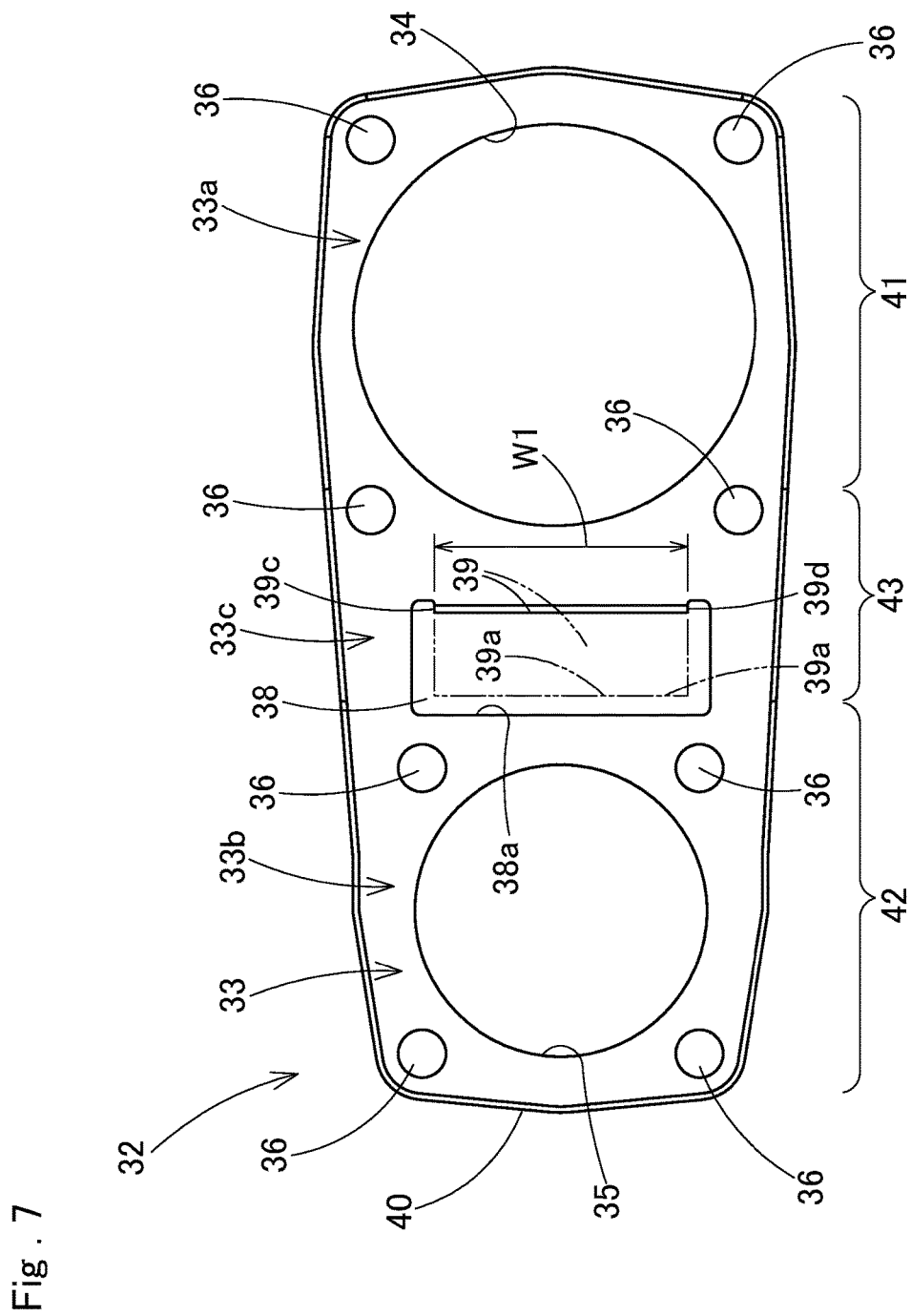
FIG. 7 is a plan view of the retainer.

The retainer 32 further includes, at an entire outer circumferential edge of the holding plate section 33, a reinforcing rib 40 which rises upward. The reinforcing rib 40 helps keep the holding plate section 33 in a flat plate shape and enhance bending rigidity of the holding plate section 33. The reinforcing rib 40 is so formed that the upper end 40a is located at vicinities of the heights of the top end planes 52b and 62b of the main bodies 52 and 62 of the inflators 51 and 61 as mounted on the case 22 in each of surrounding areas of the inflators 51 and 61. In other words, a portion of the reinforcing rib 40 in the vicinity of the inflator 51 extends up to the vicinity of the height of the top end plane 52b of the main body 52 of the inflator 51, and a portion of the reinforcing rib 40 in the vicinity of the inflator 61 extends up to the vicinity of the height of the top end plane 62a of the main body 62 of the inflator 61. In the illustrated embodiment, the upper end 40a is located at the same heights as the top end planes 52b and 62b of the main bodies 52 and 62 of the inflators 51 and 61 as mounted on the case 22. In the illustrated embodiment, the top end plane 62b of the inflator 61 is located at a lower position than the top end plane 52b of the inflator 51. Accordingly, the reinforcing rib 40 includes a first wall region 41 which surrounds the front, rear and right sides of the inflator 51, a second wall region 42 which surrounds the front, rear and left sides of the inflator 61 and is less than the first wall region 41 in height and an intermediate region 43 which gradually increases in height towards the first wall region 41 from the second wall region 42. The intermediate region 43 ranges from the location of the bolts 36 of the broad square section 33a on a side closer to the narrow square section 33b to a vicinity of the left edge 38a of the cut-out portion 38, as shown in FIG. 7.

The side wall 27 of the case 22 stands taller than the upper end 40a of the reinforcing rib 40. The reinforcing rib 40 is disposed at an inner side of the side wall 27 of the case 22 such that a clearance is formed between the rib 40 and side wall 27.

Assembling of the airbag device 10 is now described. Firstly, the retainer 32 is placed inside the airbag 11 such that the insert openings 34 and 35 conform to the inlet ports 14 and 15 and the bolts 36 go through the mounting holes 16 to the outside of the airbag 11. Then the airbag 11 is folded up into a generally rectangular parallelepiped so as to be housed in the case 22. The folded-up airbag 11 is wrapped by a wrapping sheet 72 for keeping the folded-up configuration. The wrapping sheet 72 is breakable when the airbag 11 is inflated. As shown in FIGS. 3 and 4, the folded-up airbag 11 has such a shape that a region where the auxiliary inflatable section 18 is disposed is raised because of bulkiness of the auxiliary inflatable section 18.

Supported by the reinforcing rib 40 and shielding wall 39 of the retainer 32, a folded-up region of the airbag 11 is prevented from sagging towards the insert openings 34 and 35 of the holding plate section 33, thus an inserting space (or storing space) 51 and an inserting space (or storing space) S2 are formed above the openings 34 and 35 for accommodating the main bodies 52 and 62 of the inflators 51 and 61, as shown in FIG. 3.

Thereafter, the airbag 11 is placed on the bottom wall 23 of the case 22 such that the bolts 36 of the retainer 32 protrude out of the mounting holes 26 of the case 22. Then the main bodies 52 and 62 of the inflators 51 and 61 are set in the openings 24 and 25 of the case 22, the inlet ports 14 and 15 of the airbag 11 and the openings 34 and 35 of the retainer 32 from below such that the bolts 36 go through the mounting holes 58 and 68 of the flanges 57 and 67 of the inflators 51 and 61. If then the bolts 36 are fastened with nuts 45, the airbag 11 and inflators 51 and 61 are mounted on the bottom wall 23 of the case 22 and the airbag device 10 is completed as shown in FIG. 1.

Thereafter, the case 22 is jointed to the brackets extending from the dashboard reinforcement of the vehicle V with the aid of the mounting members 30, and the inflators 51 and 61 are connected with lead wires extending from a not-shown control device for actuating the airbag device 10. Then if the dashboard 1 is mounted on the vehicle V by having the retaining hooks 28 of the case 22 engaged with the retaining holes 70d of the side wall 70c of the airbag cover 70, the airbag device 10 is mounted on the vehicle V.

After the airbag device 10 for a front passenger seat is mounted on the vehicle V, if the inflators 51 and 61 are fed with an actuating signal, the inflators 51 and 61 will emit an inflation gas G out of the outlet ports 54, 55 and 64 into the airbag 11, and the airbag 11 fed with the inflation gas G will break the wrapping sheet 72 and push and open the doors 70a and 70b of the airbag cover 70, protrude out of the case 22, and be deployed rearward as shown in FIGS. 1 (double-dotted lines) and 12.

With the airbag device 10 of the illustrated embodiment, when the passenger PM is of large build, an inflation gas G is discharged first out of the gas outlet ports 54 of the inflator 51, then out of the gas outlet ports 64 of the inflator 61, and the gas outlet ports 55 of the inflator 51 in order at predetermined intervals. When the passenger PM is of small build, an inflation gas G is discharged first out of the gas outlet ports 54 of the inflator 51, then after a predetermined interval, discharged out of the gas outlet ports 64 of the inflator 61 and gas outlet ports 55 of the inflator 51 at the same time.

That is, with the airbag 10 of the illustrated embodiment, the potentially-influential inflator 51 which may influence the other inflator (i.e. potentially-influenced inflator) 61 is actuated first and emits the inflation gas G in a direction perpendicular to the axial direction of the main body 52. However, the gas G emitted out of the potentially-influential inflator 51 towards the inflator 61 will hit the shielding wall 39 and be redirected upward (towards a direction away from the holding plate section 33). Further, since the shielding wall 39 extends to a position higher than the gas outlet ports 54 of the potentially-influential inflator 51, it will shield the potentially-influenced inflator 61 from the inflation gas G emitted out of the potentially-influential inflator 51 in a steady fashion, and prevent a breakage of the sealing tape of the inflator 61 which may cause a chain-reaction ignition or the like of the inflator 61. Moreover, the shielding wall 39 has such a height as to extend to a vicinity of the top end plane 52b of the main body 52 of the potentially-influential inflator 51. That is, the shielding wall 39 is not too tall. This configuration will not reduce a storing space for the airbag 11 inside the case 22. In addition, the shielding wall 39 has only to be formed to rise from the holding plate section 33.

Therefore, the airbag device 10 for a front passenger seat is capable of actuating both of the two inflators 51 and 61 smoothly by preventing the potentially-influential inflator 51 from influencing the other inflator 61, with a simple remedy of providing the shielding wall 39.

In the illustrated embodiment, the inflator 51 configured to be actuated prior to the inflator 61 is described as an example of the potentially-influential inflator whose inflation gas would influence the other inflator without the shielding wall 39. In this instance, the shielding wall 39 will redirect the inflation gas G emitted from the inflator 51 and prevent the gas G from hitting the inflator 61 and breaking the sealing tape of the inflator 61.

Figure 8:
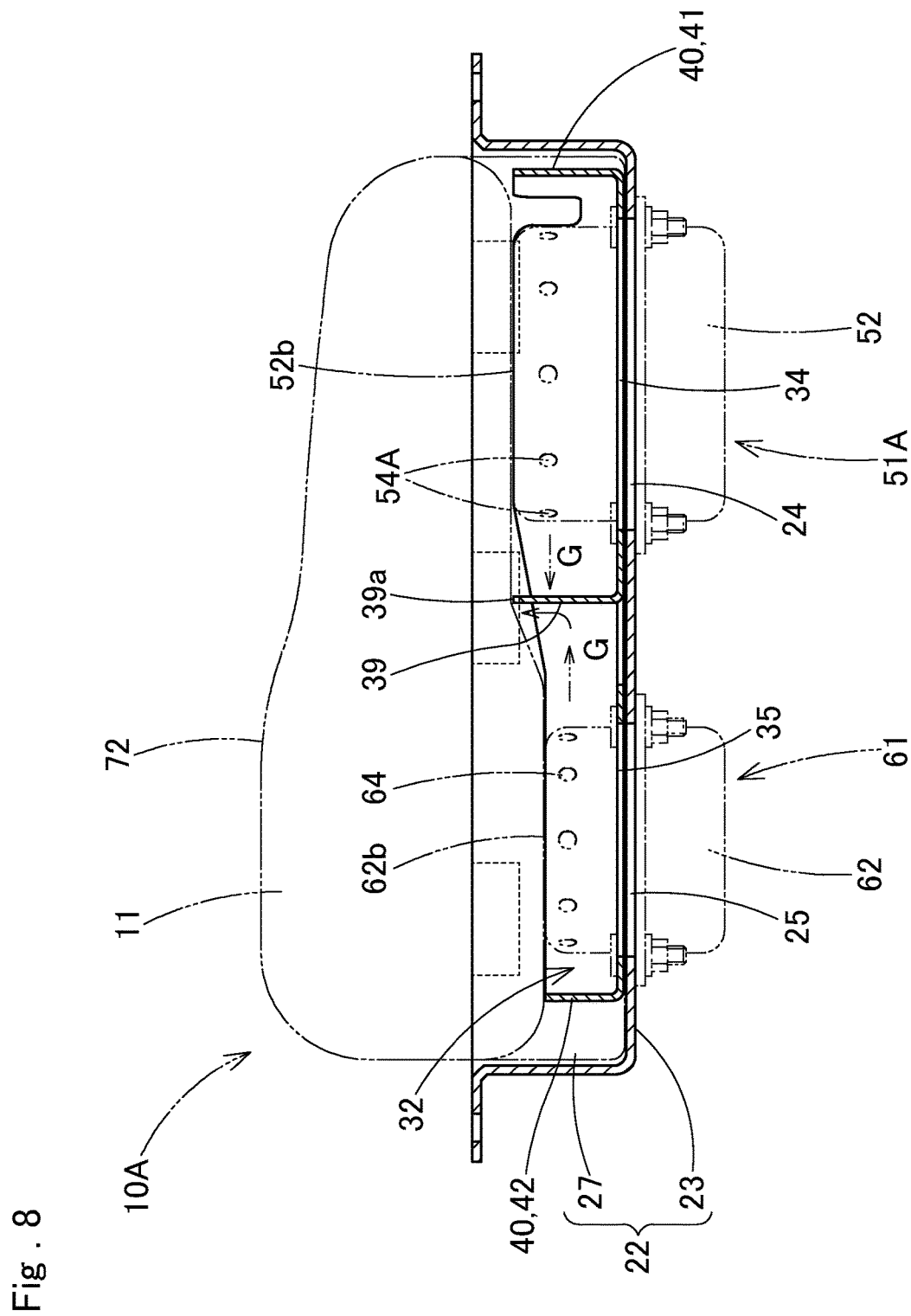
FIG. 8 is a schematic vertical section of an airbag device for a front passenger seat according to an alternative embodiment of the invention, taken along a left and right direction of a vehicle.

FIG. 8 depicts an airbag device 10A according to another embodiment of the invention. In the airbag device 10A, gas outlet ports 54A of one of the two inflators (i.e. potentially-influential) inflator 51A are located at a higher position than gas outlet ports 64 of the other inflator 61. In this instance, even when the two inflators 51A and 61 are actuated at the same time, an inflation gas G emitted by the gas outlet ports 54A of the potentially-influential inflator 51A (i.e. from the higher position) may influence the other inflator 61 without a shielding wall 39. However, the shielding wall 39 will shield the inflator 61 from the inflation gas G of the potentially-influential inflator 51, such that an inflation gas G emitted from the gas outlet ports 64 of the inflator 61 will be fed into the airbag 11 unaffectedly and inflate the airbag 11 into a predetermined contour. Of course, if the inflator 51A is actuated prior to the inflator 61 in the above airbag device 10A, the shielding wall 39 will also prevent a breakage of a sealing tape of the inflator 61.

In the airbag device 10 for a front passenger seat, the inflator 51 (i.e. one of the inflators 51 and 61) has two rows of the gas outlet ports 54 and 55 disposed one above the other on the outer circumferential plane 52a of the main body 52 so as to emit the inflation gas G out of one row before the other. This configuration will enable a variety of actuation patterns of the two inflators 51 and 61 according to physical size or the like of a passenger to be protected. In the illustrated embodiment, the airbag device 10 is programmed, when the passenger PM is of large build (a man, by way of example), to discharge an inflation gas G first out of the gas outlet ports 54 of the inflator 51, then (about 10 ms later) discharge an inflation gas G out of the gas outlet ports 64 of the inflator 61, and then (about 50 ms after the initial actuation of the inflator 51) discharge an inflation gas G out of the gas outlet ports 55 of the inflator 51. If the passenger PM is of small build (a woman, by way of example), the inflation gas G is discharged out of the gas outlet ports 54 of the inflator 51, then (about 10 ms later) discharged out of the gas outlet ports 64 of the inflator 61 and gas outlet ports 55 of the inflator 51 at the same time.

In the airbag device 10 of the illustrated embodiment, the holding plate section 33 of the retainer 32 is made of a metal plate (steel plate), and the shielding wall 39 is formed by cutting and raising a portion of the metal plate.

When the retainer 32 is produced out of a metal plate by pressing, such a shielding wall 39 can be formed easily at the same time as the insert openings 34 and 35 and the reinforcing rib 40 are formed, by cutting out a portion 38 of the metal plate in a predetermined shape and bending upward a portion on the inner side of the cut-out portion 38.

If such an advantageous effect does not have to be considered, the shielding wall 39 may be formed by mounting a separate member on the holding plate section 33 by welding or the like.

In the airbag device 10 of the illustrated embodiment, the retainer 32 further includes the reinforcing rib 40 which rises from the entire outer circumferential edge of the holding plate section 33. The portion of the reinforcing rib 40 disposed in the surrounding area of the inflator 51 extends up to the vicinity of the height of the top end plane 52b of the main body 52 of the inflator 51, and the portion of the reinforcing rib 40 disposed in the surrounding area of the inflator 61 extends up to the vicinity of the height of the top end plane 62b of the main body 62 of the inflator 62.

This configuration will facilitate the setting of the main bodies 51 and 52 of the inflators 51 and 61 into the airbag 11 via the insert openings 24 and 25 of the case 22, the insert openings 34 and 35 of the retainer 32 and inlet openings 14 and 15 of the airbag 11. To describe specifically, before the main bodies 51 and 52 are put into the airbag 11, the airbag 11 in a folded-up configuration is placed on the bottom wall 23 of the case 22. Inside the airbag 11 is the retainer 32, and the bolts 36 of the retainer 32 protrude downward out of the bottom wall 23 of the case 22. Since the reinforcing rib 40 of the retainer 32 stands as tall as the top end plane 52b of the main body 52 of the inflator 51 in the surrounding area of the inflator 51 and stands as tall as the top end plane 62b of the main body 62 of the inflator 61 in the surrounding area of the inflator 61, the reinforcing rib 40 and the shielding wall 39 support the airbag 11 with the upper ends 40a and 39a such that the folded-up region of the airbag 11 may not sag towards the insert openings 34 and 35 of the holding plate section 33 and the storing spaces 51 and S2 for the main bodies 52 and 62 of the inflators 51 and 61 are secured above the insert openings 34 and 35. As a consequence, the main bodies 52 and 62 of the inflators 51 and 61 can be easily inserted into the airbag 11 via the insert openings 24 and 25 of the case 22 without so much need to push up the folded-up region of the airbag 11. Thereafter, by nut-fastening of the bolts 36 of the retainer 32 protruding out of the mounting holes 58 and 68 of the flanges 57 and 67, the inflators 51 and 61 are secured to the bottom wall 23 of the case 22 as well as the airbag 11 smoothly.

The shielding wall 39 of the illustrated embodiment is so formed that the upper end 39a conforms in height to the top end plane 52b of the potentially-influential inflator 51 which can influence the other inflator 61 without the shielding wall 39. However, the height of the shielding wall 39 may be slightly greater or smaller than that of the top end plane 52b of the potentially-influential inflator 51 to an extent not hindering the advantageous effect of the invention significantly.

The reinforcing rib 40 is also so formed that the upper end 40a conforms in height to the top end plane 52a or 62a of the nearby inflator 51 or 61. But in a similar fashion, the height of the first wall region 41 (which is disposed in the vicinity of the inflator 51) and the height of the second wall region 42 (which is disposed in the vicinity of the inflator 61) of the reinforcing rib 40 may be slightly greater or smaller than that of the top end plane 52b or 62b of nearby inflator 51 or 61 to an extent not hindering the advantageous effect of the invention significantly.

In the illustrated embodiment, the case 22 includes the side wall 27 which extends upward from the outer circumferential edge of the bottom wall 23 and is taller than the reinforcing rib 40. The reinforcing rib 40 is disposed at an inner side of the side wall 27 of the case 22 such that a clearance is formed between the reinforcing rib 40 and the side wall 27. With this configuration, the case 22 will smoothly accommodate the folded-up airbag 11 in a space surrounded by the side wall 27 above the reinforcing rib 40. Of course, the reinforcing rib 40 of the retainer 32 helps secure storing spaces S1 and S2 above the insert openings 34 and 35 of the holding plate section 33 for receiving the main bodies 52 and 62 of the inflators 51 and 61, such that the main bodies 52 and 62 of the inflators 51 and 61 can be smoothly inserted into the case 22 from below the bottom wall 23 of the case 22.

In the illustrated embodiment, furthermore, the main body 52 of the inflator (one of the two inflators) 51 has a greater diameter D1 than the main body 62 of the inflator (the other inflator) 61, and the width W1 of the shielding wall 39 is about 65 mm, which is smaller than the greater outer diameter D1 (about 80 mm) of the main body 52 of the inflator 51 and greater than the outer diameter D2 (about 60 mm) of the main body 62 of the inflator 61. This configuration will contribute to size reduction of the shielding wall 39.

What is claimed is:

1. An airbag device for a front passenger seat of a vehicle, comprising:
    an airbag that is folded up and inflatable with an inflation gas for protecting a front seat passenger, the airbag including two inlet ports for taking in the inflation gas;
    a first inflator and a second inflator that feed the airbag with the inflation gas, each of the first inflator and the second inflator including a columnar main body which includes a top end plane and an outer circumferential plane and a flange which protrudes out of the outer circumferential plane of the main body, a region of the main body disposed towards the top end plane being provided with a plurality of gas outlet ports on the outer circumferential plane and inserted into the airbag via one of the inlet ports, the gas outlet ports of each of the first inflator and the second inflator being formed in such a manner as to form a row along a circumferential direction of the main body;
    a case that holds the airbag and the first inflator and the second inflator, the case including a bottom wall that includes two insert openings for receiving the main bodies of the first inflator and the second inflator; and
    a single retainer that is disposed at peripheries of the inlet ports inside the airbag and mounts the airbag and the first inflator and the second inflator on the bottom wall of the case, the single retainer comprising:
        a single holding plate section that is disposed at the peripheries of the inlet ports of the airbag and includes two insert openings corresponding to the inlet ports of the airbag for receiving the main bodies of the first inflator and the second inflator;
        a plurality of bolts that are formed at a periphery of each of the insert openings of the single holding plate section so as to penetrate the airbag, the bottom wall of the case and the flanges of the first inflator and the second inflator and be fastened with nuts; and
    a single shielding wall that rises out of a position of the single holding plate section between the two insert openings and extends to a vicinity of a height of the top end plane of the main body of the first inflator above a height of the gas outlet ports of the first inflator for shielding the second inflator from an inflation gas emitted by the first inflator, wherein:

the single holding plate section of the single retainer is a metal plate;

the metal plate has a bent cut-out portion that extends vertically from the metal plate, the single shielding wall is composed of the bent cut-out portion.

2. The airbag device for a front passenger seat of claim 1 configured to actuate the first inflator prior to the second inflator.

3. The airbag device for a front passenger seat of claim 1, wherein the gas outlet ports of the first inflator are located at a higher position than those of the second inflator.

4. The airbag device for a front passenger seat of claim 1, wherein at least one of the inflators has two rows of the gas outlet ports disposed one above the other on the outer circumferential plane of the main body so as to emit the inflation gas out of one row before the other.

5. An airbag device for a front passenger seat of a vehicle, comprising:

an airbag that is folded up and inflatable with an inflation gas for protecting a front seat passenger, the airbag including two inlet ports for taking in the inflation gas;

a first inflator and a second inflator that feed the airbag with the inflation gas, each of the first inflator and the second inflator including a columnar main body which includes a top end plane and an outer circumferential plane and a flange which protrudes out of the outer circumferential plane of the main body, a region of the main body disposed towards the top end plane being provided with a plurality of gas outlet ports on the outer circumferential plane and inserted into the airbag via one of the inlet ports, the gas outlet ports of each of the first inflator and the second inflator being formed in such a manner as to form a row along a circumferential direction of the main body;

a case that holds the airbag and the first inflator and the second inflator, the case including a bottom wall that includes two insert openings for receiving the main bodies of the first inflator and the second inflator; and a retainer that is disposed at peripheries of the inlet ports inside the airbag and mounts the airbag and the first inflator and the second inflator on the bottom wall of the case, the retainer comprising:

a holding plate section that is disposed at the peripheries of the inlet ports of the airbag and includes two insert openings corresponding to the inlet ports of the airbag for receiving the main bodies of the first inflator and the second inflator;

a plurality of bolts that are formed at a periphery of each of the insert openings of the holding plate section so as to penetrate the airbag, the bottom wall of the case and the flanges of the first inflator and the second inflator and be fastened with nuts; and a shielding wall that rises out of a position of the holding plate section between the two insert openings and extends to a vicinity of a height of the top end plane of the main body of the first inflator above a height of the gas outlet ports of the first inflator for shielding the second inflator from an inflation gas emitted by the first inflator, wherein:

the retainer further includes a reinforcing rib that rises from an entire outer circumferential edge of the holding plate section;

a portion of the reinforcing rib disposed in a surrounding area of the first inflator extends up to a vicinity of the height of the top end plane of the main body of the first inflator; and a portion of the reinforcing rib disposed in a surrounding area of the second inflator extends up to a vicinity of a height of the top end plane of the main body of the second inflator.

6. The airbag device for a front passenger seat of claim 5, wherein:

the case includes a side wall that extends upward from an outer circumferential edge of the bottom wall to a position higher than the reinforcing rib; and the reinforcing rib is disposed at an inner side of the side wall of the case such that a clearance is formed between the reinforcing rib and the side wall.

7. An airbag device for a front passenger seat of a vehicle, comprising:

an airbag that is folded up and inflatable with an inflation gas for protecting a front seat passenger, the airbag including two inlet ports for taking in the inflation gas;

a first inflator and a second inflator that feed the airbag with the inflation gas, each of the first inflator and the second inflator including a columnar main body which includes a top end plane and an outer circumferential plane and a flange which protrudes out of the outer circumferential plane of the main body, a region of the main body disposed towards the top end plane being provided with a plurality of gas outlet ports on the outer circumferential plane and inserted into the airbag via one of the inlet ports, the gas outlet ports of each of the first inflator and the second inflator being formed in such a manner as to form a row along a circumferential direction of the main body;

a case that holds the airbag and the first inflator and the second inflator, the case including a bottom wall that includes two insert openings for receiving the main bodies of the first inflator and the second inflator; and a retainer that is disposed at peripheries of the inlet ports inside the airbag and mounts the airbag and the first inflator and the second inflator on the bottom wall of the case, the retainer comprising:

a holding plate section that is disposed at the peripheries of the inlet ports of the airbag and includes two insert openings corresponding to the inlet ports of the airbag for receiving the main bodies of the first inflator and the second inflator;

a plurality of bolts that are formed at a periphery of each of the insert openings of the holding plate section so as to penetrate the airbag, the bottom wall of the case and the flanges of the first inflator and the second inflator and be fastened with nuts; and a shielding wall that rises out of a position of the holding plate section between the two insert openings and extends to a vicinity of a height of the top end plane of the main body of the first inflator above a height of the gas outlet ports of the first inflator for shielding the second inflator from an inflation gas emitted by the first inflator, wherein:

the main body of one of the inflators has a greater outer diameter than that of the other inflator; and the shielding wall has such a width that is smaller than the greater outer diameter and greater than an outer diameter of the main body of the other inflator.

8. An airbag device for a front passenger seat of a vehicle, comprising:
- an airbag that is folded up and inflatable with an inflation gas for protecting a front seat passenger, the airbag including two inlet ports for taking in the inflation gas;
- a first inflator and a second inflator that feed the airbag with the inflation gas, each of the first inflator and the second inflator including a columnar main body which includes a top end plane and an outer circumferential plane and a flange which protrudes out of the outer circumferential plane of the main body, a region of the main body disposed towards the top end plane being provided with a plurality of gas outlet ports on the outer circumferential plane and inserted into the airbag via one of the inlet ports, the gas outlet ports of each of the first inflator and the second inflator being formed in such a manner as to form a row along a circumferential direction of the main body;
- a case that holds the airbag and the first inflator and the second inflator, the case including a bottom wall that includes two insert openings for receiving the main bodies of the first inflator and the second inflator; and
- a single retainer that is disposed at peripheries of the inlet ports inside the airbag and mounts the airbag and the first inflator and the second inflator on the bottom wall of the case, the single retainer comprising:
  - a single holding plate section that is disposed at the peripheries of the inlet ports of the airbag and includes two insert openings corresponding to the inlet ports of the airbag for receiving the main bodies of the first inflator and the second inflator;
  - a plurality of bolts that are formed at a periphery of each of the insert openings of the single holding plate section so as to penetrate the airbag, the bottom wall of the case and the flanges of the first inflator and the second inflator and be fastened with nuts; and
  - a single shielding wall that rises out of a position of the single holding plate section between the two insert openings and extends to a vicinity of a height of the top end plane of the main body of the first inflator above a height of the gas outlet ports of the first inflator for shielding the second inflator from an inflation gas emitted by the first inflator,
- wherein the single retainer further includes a reinforcing rib that rises from an entire outer circumferential edge of the single holding plate section.

9. The airbag device for a front passenger seat of claim 8 configured to actuate the first inflator prior to the second inflator.

10. The airbag device for a front passenger seat of claim 8, wherein the gas outlet ports of the first inflator are located at a higher position than those of the second inflator.

11. The airbag device for a front passenger seat of claim 8, wherein at least one of the inflators has two rows of the gas outlet ports disposed one above the other on the outer circumferential plane of the main body so as to emit the inflation gas out of one row before the other.

* * * * *